(12) United States Patent
Benscoter et al.

(10) Patent No.: US 7,591,173 B2
(45) Date of Patent: Sep. 22, 2009

(54) METHOD AND APPARATUS FOR MONITORING THE RESTRICTION LEVEL OF A VEHICULAR AIR FILTER ELEMENT

(75) Inventors: Scott J. Benscoter, Metamora, MI (US); Lawrence A. Staat, Beverly Hills, MI (US); Dennis P. Stenson, Highland, MI (US); Steven J. Mc Cormick, Goodrich, MI (US); Roger G. Van Vechten, St. Clair Shores, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 119 days.

(21) Appl. No.: 11/682,496

(22) Filed: Mar. 6, 2007

(65) Prior Publication Data

US 2008/0229720 A1 Sep. 25, 2008

(51) Int. Cl.
*G01M 15/09* (2006.01)
(52) U.S. Cl. .................................... 73/114.33
(58) Field of Classification Search .............. 73/114.31, 73/114.32, 114.33, 114.35, 114.36, 114.37; 116/DIG. 25
See application file for complete search history.

(56) References Cited

U.S. PATENT DOCUMENTS

| | | | | |
|---|---|---|---|---|
| 5,604,306 A | * | 2/1997 | Schricker | 73/114.31 |
| 5,606,311 A | * | 2/1997 | Polidan et al. | 340/607 |
| 7,032,573 B2 | * | 4/2006 | Ardisana | 123/434 |
| 7,305,301 B1 | * | 12/2007 | Wang et al. | 701/114 |
| 7,441,449 B2 | * | 10/2008 | Wang et al. | 73/114.31 |
| 7,441,450 B2 | * | 10/2008 | Mc Lain et al. | 73/114.37 |
| 7,444,234 B2 | * | 10/2008 | Bauerle | 701/114 |
| 2005/0240338 A1 | * | 10/2005 | Ardisana | 701/114 |
| 2008/0223123 A1 | * | 9/2008 | Wang et al. | 73/114.31 |

\* cited by examiner

*Primary Examiner*—Eric S McCall

(57) ABSTRACT

A process is provided for monitoring the filter restriction level of a filter element. The filter element is utilized by an air induction system deployed on a vehicle that includes a mass air flow sensor, a manifold pressure sensor, and a throttle position sensor. The process includes receiving (i) throttle position from the throttle position sensor, (ii) mass flow rate from the mass air flow sensor, and (iii) manifold pressure from the manifold pressure sensor. A reference pressure is determined from the received mass flow rate and the received throttle position, a pressure differential is established between the reference pressure and the received manifold pressure, and a filter restriction level is identified from the established pressure differential and the received mass flow rate.

19 Claims, 3 Drawing Sheets

METHOD AND APPARATUS FOR MONITORING THE RESTRICTION LEVEL OF A VEHICULAR AIR FILTER ELEMENT

TECHNICAL FIELD

The present invention generally relates to a vehicular filter restriction monitoring system and, more particularly, to a method for monitoring the restriction level of an air filter element employed by a vehicular air induction system.

BACKGROUND OF THE INVENTION

Air filters are well-known devices that are positioned within an airflow path to remove particulate matter (e.g., dust, pollen, mold, bacteria, and other debris) therefrom. At least one air filter element is commonly employed in a vehicle's air induction system. The air filter element prevents particulate matter from traveling downstream through the intake manifold and into the combustion chambers of the vehicle's internal combustion engine. Vehicular filter elements are typically rectangular panels, but may also assume other shapes (e.g., annular or conical shapes). Due to their desirable filtration properties and low cost, disposable paper-based filter elements are commonly utilized; however, other types of filter element may also be employed including disposable foam air filters and reusable/cleanable cotton air filters.

As it continues to trap particulate matter, the air filter element slowly saturates with debris, and airflow through the element becomes impeded or restricted. When the air filter element becomes fully saturated (or dirty), airflow therethrough is substantially restricted and a considerable decrease in downstream pressure results. When employed in a vehicular air induction system, a fully saturated filter element may negatively impact the performance of the internal combustion engine. For example, a restricted filter element may lead to diminished horsepower and fuel efficiency. It is thus important to replace the air filter element (or clean a reusable filter element) when the element becomes overly restricted or dirty. An air filter element typically requires replacement or cleaning when the restriction level reaches, for example, 10 inches of water vacuum.

Unfortunately, it is often cumbersome to determine if an air filter element requires replacement. A visual inspection may be performed, but is typically inconvenient, inaccurate for determining remaining air filter life, and may require the services of a mechanic. Changing the air filter element after the accumulation of a certain number of miles (e.g., during each oil change) may result in the premature replacement of relatively clean filter elements or the overdue replacement of dirty filter elements.

Devices have been developed that may be installed in a vehicle's air induction system to monitor the restriction level of the air filter element; however, the installment of additional hardware increases vehicle part count and incurs additional cost. Furthermore, such filter monitoring devices are typically installed within a vehicle's engine compartment and typically require visual inspection to determine if the air filter element should be replaced.

Considering the foregoing, it would be desirable to provide a method and system for monitoring the restriction level of a vehicle's air filter element that may be performed by an onboard processor without the requirement of additional hardware. It would also be desirable if such a method and system provided an indication within the vehicle's passenger compartment when a filter element should be replaced. Finally, it would be desirable if such a method and system were to provide additional information relating to the status of the air filter element, such as remaining filter element life. Other desirable features and characteristics of various embodiments of the present invention will become apparent from the subsequent detailed description and the appended claims, taken in conjunction with the accompanying drawings and the foregoing technical field and background.

SUMMARY OF THE INVENTION

According to various exemplary embodiments of the present invention, a process is provided for monitoring the filter restriction level of a filter element. The filter element is utilized by an air induction system deployed on a vehicle that includes a mass air flow sensor, a manifold pressure sensor, and a throttle position sensor. The process includes receiving (i) throttle position from the throttle position sensor, (ii) mass flow rate from the mass air flow sensor, and (iii) manifold pressure from the manifold pressure sensor. A reference pressure is determined from the received mass flow rate and the received throttle position, a pressure differential is established between the reference pressure and the received manifold pressure, and a filter restriction level is identified from the established pressure differential and the received mass flow rate.

DESCRIPTION OF THE DRAWINGS

The present invention will hereinafter be described in conjunction with the following drawing figures, wherein like numerals denote like elements, and.

DESCRIPTION OF ONE OR MORE EXEMPLARY EMBODIMENTS

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
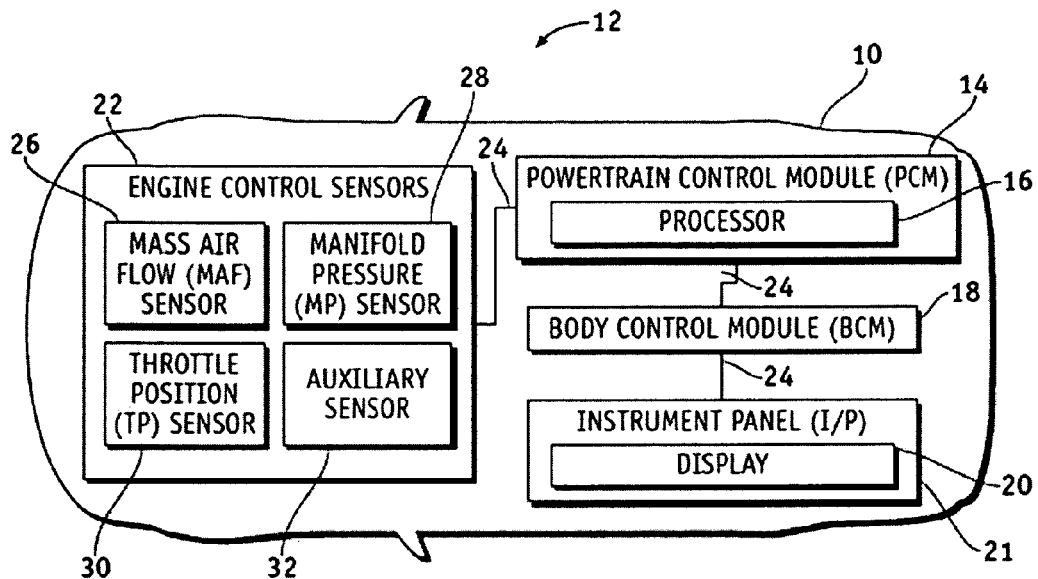
FIG. 1 is a functional view of an exemplary vehicular filter restriction monitoring system including a plurality of engine control sensors, a powertrain module, and a body control module suitable for performing an embodiment of the inventive method.

FIG. 1 is a functional view of a vehicle 10 including an onboard filter restriction monitoring system 12 suitable for performing an embodiment of the inventive air filter monitoring method. Filter restriction monitoring system 12 suitably includes a powertrain control module (PCM) 14 including a powertrain processor 16, a body control module (BCM) 18, an instrument panel (I/P) 21 including a display 20, and a number of engine control sensors 22. PCM 14, BCM 18, I/P 21 and engine control sensors 22 are electrically coupled by way of communication lines 24, which may include, for example, one or more serial or parallel data buses. Collectively, communication lines 24 may provide a controller area network utilizing standard communication protocols (e.g., J1850 type protocols).

PCM 14 receives data provided by engine control sensors 22 regarding the operational characteristics of the internal combustion engine of vehicle 10. In response to this data, PCM 14 may adjust the operational conditions of the internal combustion engine to maintain desired performance levels. For example, PCM 14 may monitor characteristics of the air entering the engine's combustion chambers and determine therefrom an appropriate amount of fuel to inject into the engine's combustion chambers. Typically, PCM 14 will utilize engine control sensors 22 to continuously monitor the operational characteristics of the engine, which are then evaluated in processor 16 in "real time"; however, continuous monitoring and real time processing are by no means essential to the performance of the inventive method.

BCM 18 controls various features of vehicle 10, which may include the HVAC system, the interior and exterior lighting, the audio system, and the door lock functions. In the illustrated embodiment, BCM 18 is coupled to a display 20 (e.g., a liquid crystal display) capable of displaying one or more lines of text. Display 20 may be associated with a variety of vehicular system and may be disposed at various locations within the cabin of vehicle 10 (e.g., within the vehicle's windshield). For example, as indicated in FIG. 1, display 20 may be associated with I/P 21 and may be mounted proximate the vehicle's dash. Alternatively, display 20 may be associated with a Driver Information Center (DIC), which may be disposed on the vehicle's center stack located between the driver seat and the front passenger seat. The DIC may include any number of user inputs (e.g., three to five buttons) that permit a user to navigate through a tiered hierarchy of menus displayed on display 20 to view vehicle status data and to select desired settings for adjustable vehicular features (e.g., door lock settings). As will be explained below, filter restriction monitoring system 12 may utilize display 20 to indicate when the air filter element requires replacement. In addition, system 12 may utilize display 20 to provide additional data regarding the status of the air filter element, such as remaining life.

Engine control sensors 22 monitor various operational characteristics of the internal combustion engine of vehicle 10. In the illustrated embodiment, engine control sensors 22 include: (1) a mass air flow (MAF) sensor 26, (2) a manifold pressure (MP) sensor 28, and (3) a throttle position (TP) sensor 30. MAF sensor 26, MP sensor 28, and TP sensor 30 may comprise any device suitable for measuring the mass air flow rate, the manifold pressure, and the throttle position, respectively, of an internal combustion engine. In addition, engine control sensors 22 may include one or more auxiliary sensors 32 that measure additional operational characteristics of the internal combustion engine. For example, auxiliary sensors 32 may include one or more of the following: (1) an inlet air temperature sensor, (2) an engine RPM sensor, (3) a vehicle speed sensor, (4) a vehicle mileage recorder, and/or (5) a barometric sensor, which may be utilized to determine when an air filter element has been changed as explained below.

Figure 2:
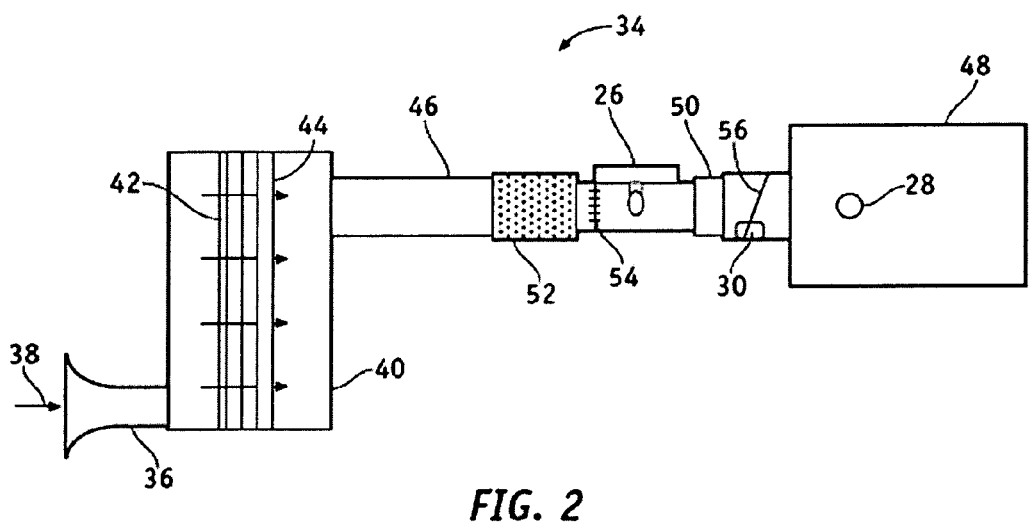
FIG. 2 is a cross-sectional view of an exemplary air induction system deployed on the vehicle shown in FIG. 1.

FIG. 2 is a cross-sectional view of an air induction system 34 that may be deployed on vehicle 10 and included in filter restriction monitoring system 12. Air induction system 34 suitably includes an air inlet 36, which receives airflow 38. Air inlet 36 is coupled to an air cleaner assembly 40 that houses an air filter element 42 and possibly one or more absorbers 44 (e.g., a hydrocarbon absorber, nitrous oxide absorber, and/or a carbon monoxide absorber). An air duct 46 includes a first end coupled to air cleaner assembly 40 and a second end coupled to intake manifold 48 via annular clamp 50. A series of convolutes 52 and a honeycell 54 reside within air duct 46 and condition the flow characteristics of the airflow through duct 46. A throttle 56 is positioned within intake manifold 48 and may be moved between any number of rotational positions to control the flow of air into intake manifold 48. For example, throttle 56 may be moved between a fully closed position (0%) in which throttle 56 substantially prevents airflow into manifold 48 and a fully opened position (100%) in which throttle 56 does not prevent airflow into manifold 48. Sensors 26, 28, and 30 are deployed at various locations within air induction system 34. For example, MAF sensor 26 may be disposed within air duct 46 downstream of honeycell 54, MP sensor 28 may be disposed proximate the inlet of manifold 48, and TP sensor may reside adjacent throttle 56 as shown.

Airflow 38 passes through filter element 42, which removes particulate matter therefrom. In so doing, filter element 42 accumulates debris, which, over time, restricts the passage of airflow 38 through element 42. The restriction of filter element 42 results in a pressure drop within intake manifold 48. For example, as an embodiment of filter element 42 approaches a filter element restriction of approximately 10 inches of water vacuum, intake manifold 48 may experience a pressure drop equal to or exceeding 2.5 kilopascals for an air flow rate of approximately 250 grams per second. This drop in pressure negatively impacts the performance of the internal combustion engine of vehicle 10.

Figure 3:
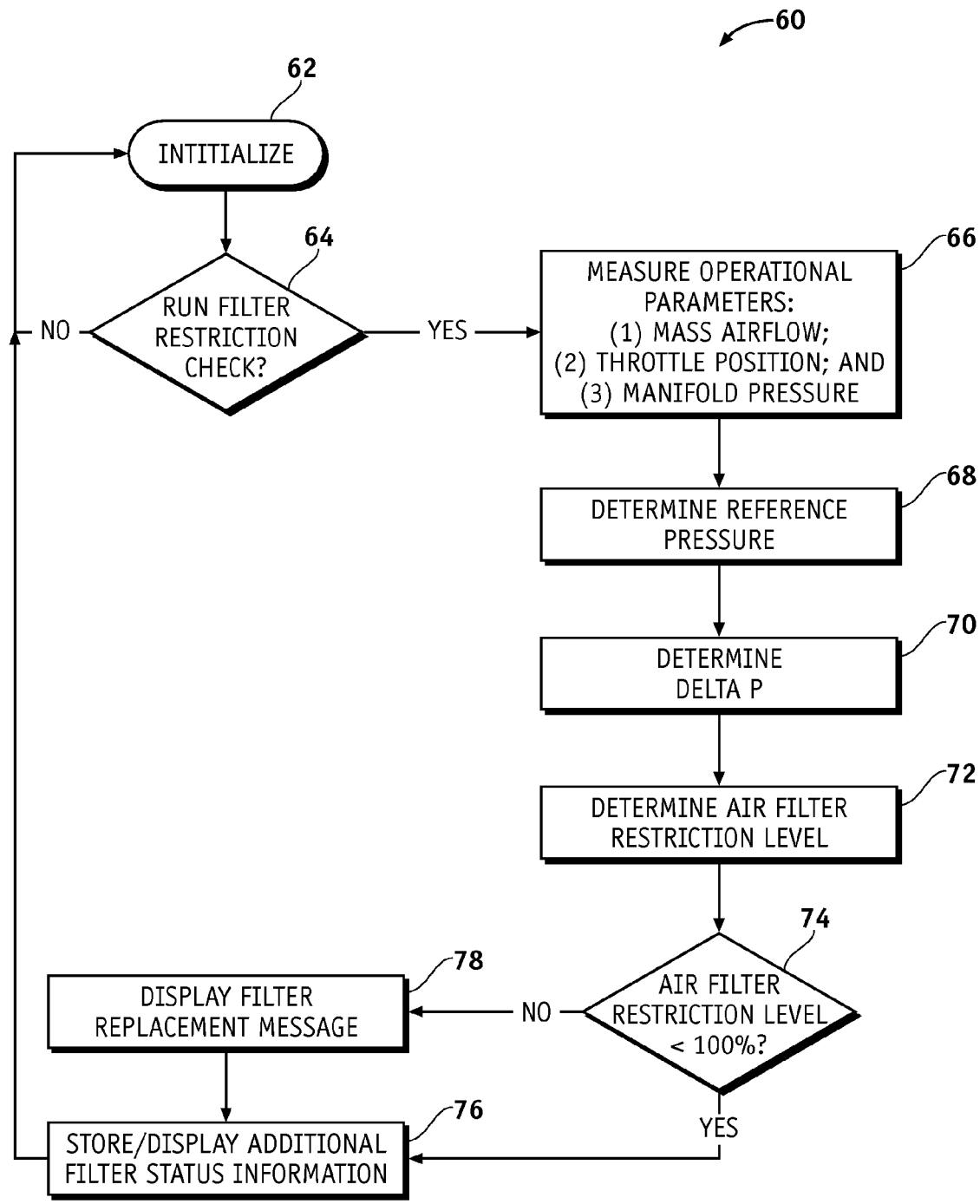
FIG. 3 is a flowchart illustrating an exemplary embodiment of the inventive air filter monitoring process that may be performed by the system shown in FIG. 1.

FIG. 3 is a flowchart illustrating an exemplary embodiment of an inventive air filter monitoring process 60 that may be performed by filter restriction monitoring system 12 (FIG. 1) to monitor the restriction level of air filter element 42 (FIG. 2). In particular, process 60 may be performed by processor 16 of PC module 14 or another onboard processor of vehicle 10. Process 60 may also be performed by a remote processor (i.e., a processor not located on vehicle 10) with which system 12 communicates via an onboard telematics module or the like.

After initialization of process 60 (STEP 62), processor 16 determines whether a filter restriction check should be performed (STEP 64). That is, processor 16 establishes whether operational conditions are favorable to determining the filter restriction level by comparing a current operational condition to a predetermined threshold or range. For example, processor 16 may compare the current speed of vehicle 10 (FIG. 1) to a predetermined threshold speed past which (i.e., below or above which) the filter restriction check might be less accurate. Considering an exemplary minimum threshold speed of 20 miles per hour, processor 16 determines whether the current speed of vehicle 10 exceeds 20 miles per hour. If vehicle 10 is traveling at or below 20 miles per hour, processor 16 returns to the beginning of process 60 (STEP 62). If, instead, the current vehicular speed exceeds 20 miles per hour, processor 16 advances to STEP 66 as described below.

Other minimum and maximum threshold values may be utilized in addition to, or in lieu of, a vehicular speed threshold. For example, throttle position may be considered; e.g., processor 16 may compare the position of throttle 56 (FIG. 2) to a minimum threshold value (e.g., 15%) to determine whether to advance to STEP 66 or return to STEP 62. If auxiliary sensors 32 (FIG. 2) include a barometric sensor and a mileage recorder, processor 16 may compare the number of miles that have elapsed since the last filter change to a minimum threshold (e.g., 400 miles) below which a filter replacement should not be required. Processor 16 may utilize the barometric sensor to determine when the filter element was last changed by monitoring the change in air pressure and identifying an air filter element change when the change in air pressure exceeds predetermined threshold value. Processor 16 may also consider a current operating characteristic to a predetermined range during STEP 64. For example, processor 16 may compare current engine RPM to a predetermined range (e.g., 1800-5000 RPM) and advance to STEP 66 only if the current RPM falls within the predetermined range. During STEP 64, processor 16 may also determine whether to advance onward to STEP 66 by determining whether a user has requested (e.g., via a suitable user interface, such as a DIC) a filter restriction check or by determining whether a user has indicated that no filter restriction checks are to be performed. This notwithstanding, it should understood that STEP 64 is optional and need not be included in alternative embodiments of the inventive filter restriction monitoring method.

After determining that a filter restriction check should be performed (STEP 64), processor 16 next measures or receives a selected number of operational characteristics of air induction system 34 (STEP 66). In particular, processor 16 receives mass air flow via MAF sensor 26 (FIG. 1), throttle position via TP sensor 30 (FIG. 1), and manifold pressure via MP sensor 26 (FIG. 1). Mass air flow may be measured in grams per second, throttle position may be measured as a percentage, and manifold pressure may be measured in kilopascals, although other units of measure may be utilized. Manifold pressure may be measured as an absolute pressure or as a relative (i.e., gauge) pressure.

After measuring the selected operational characteristics, processor 16 determines a reference pressure (STEP 68). In the exemplary embodiment, processor 16 determines the reference pressure utilizing the received mass flow rate and the received throttle position. Processor 16 may do this by recalling a predetermined characteristic that relates a group of mass flow rates to a group of reference pressures for the received throttle position. This predetermined characteristic may be a three-dimensional look-up table or any other suitable logic or data structures. Alternatively, the predetermined characteristic may be a function such as that shown FIG. 4 (described below). In some embodiments, processor 16 stores multiple predetermined characteristics each associated with a different throttle position. The predetermined characteristics may be developed for a certain model of vehicle utilizing a flow bench and conventional testing techniques.

Figure 4:
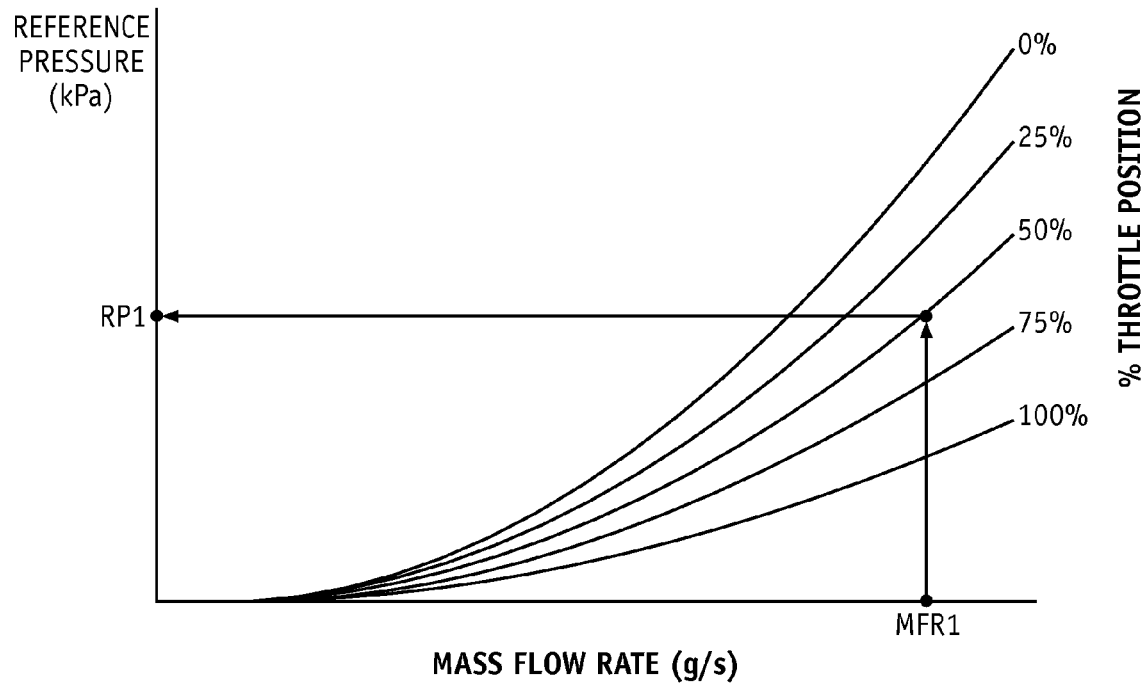
FIG. 4 is a graph of mass flow rate (horizontal-axis) versus reference pressure (vertical-axis) suitable for determining a reference pressure from a received throttle position and a received mass flow rate.

FIG. 4 is a graph of mass flow rate (horizontal-axis) versus reference pressure (vertical-axis) suitable for establishing a reference pressure from a received throttle position and mass flow rate. A family of mass flow rate vs. reference pressure characteristics is illustrated in FIG. 4 and includes a first, second, third, fourth, and fifth predetermined characteristics associated with throttle positions of 0%, 25%, 50%, 75%, and 100%, respectively. During STEP 68, processor 16 recalls the predetermined characteristic associated with the throttle position that most closely resembles the received throttle position ($TP_1$). For example, if the received throttle position ($TP_1$) is 51%, processor 16 may recall the third predetermined characteristic associated with a throttle position of 50%. Processor 16 then utilizes selected predetermined characteristic and the received mass flow rate ($MFR_1$) to establish a reference pressure ($RP_1$) as indicated in FIG. 4.

After establishing a reference pressure ($RP_1$) associated with the received mass flow rate ($MFR_1$) and the received throttle position ($TP_1$), processor 16 determines the pressure differential ($\Delta P_1$) between the determined reference pressure ($RP_1$) and the current pressure in manifold 48 utilizing MP sensor 28 (FIG. 1) as indicated in FIG. 3 at STEP 70. This is expressed by Equation 1 below:

$$|RP-MP|=\Delta P \quad (1)$$

where RP is the reference pressure and MP is the received or measured pressure.

After determining $\Delta P_1$ (STEP 70), processor 16 next determines the restriction level of air filter element 42 (FIG. 2) as indicated at STEP 72. To accomplish this, processor 16 recalls a group of predetermined characteristics associating a range of pressure differentials with a range of mass flow rates. Each of the predetermined characteristics is associated with a different filter restriction level. As was the case previously, the predetermined characteristics may take the form of a three-dimensional look-up table or a function such as that graphically illustrated in FIG. 5 (described below). Filter restriction may be expressed as a percentage of a pre-established filter restriction threshold. The pre-established filter restriction threshold represents a value at which air filter element 42 requires replacement and may be, for example, 10 inches of water vacuum. Thus, a filter restriction of 50%, 100%, or 150% would be equivalent to 5, 10, and 15 inches of water vacuum, respectively. The predetermined mass flow rate vs. $\Delta P$ characteristics may be developed for vehicle 10 and other similar vehicles utilizing a flow bench and common testing techniques.

Figure 5:
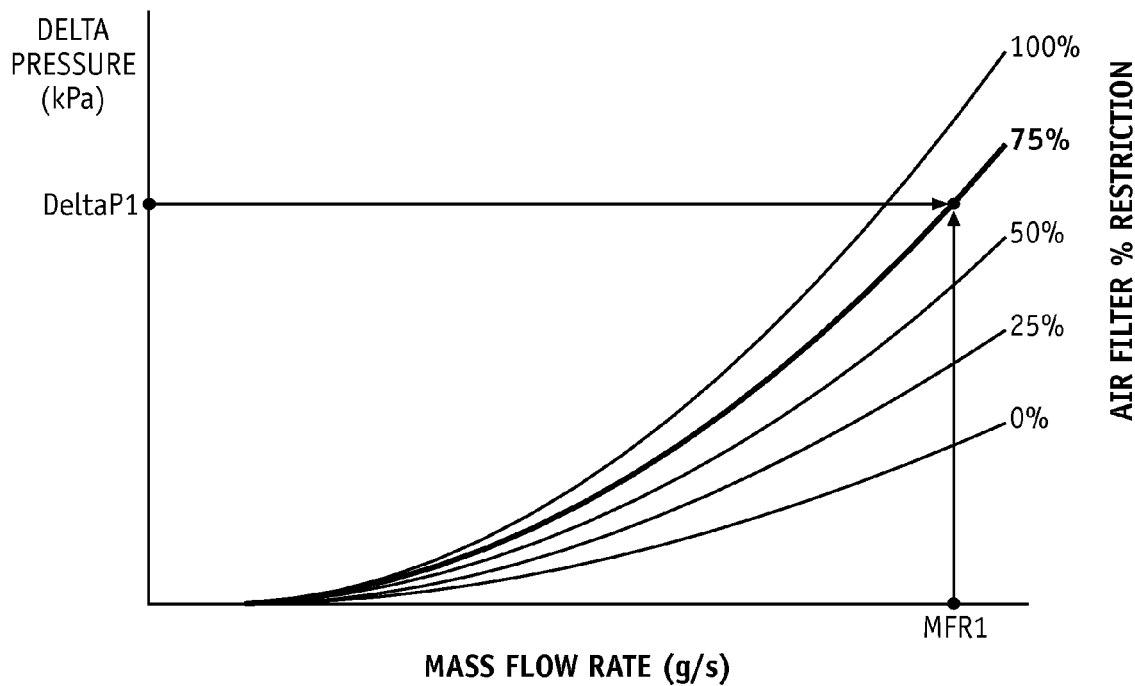
FIG. 5 is a graph of mass flow rate (horizontal-axis) versus delta pressure (vertical-axis) suitable for determining an air filter restriction level from an established delta pressure and a received mass flow rate.

FIG. 5 is a graph of mass flow rate (horizontal-axis) versus delta pressure (vertical-axis) suitable for determining a restriction percentage from an established delta pressure and a received mass flow rate. A group of mass flow rate vs. $\Delta P$ characteristics is illustrated in FIG. 5; i.e., a first, second, third, fourth, and fifth predetermined characteristics associated with restriction levels of 100%, 75%, 50%, 25%, and 0%, respectively. During STEP 72, processor compares the received mass flow rate ($MFR_1$) and the $\Delta P$ established during STEP 70 ($\Delta P_1$) to the family of predetermined characteristics to identify a corresponding predetermined characteristic and, thus, a corresponding restriction level. For example, as indicated in FIG. 5, processor 16 may determine the established $\Delta P$ ($\Delta P_1$) and the received mass flow rate ($MFR_1$) correspond to the second predetermined characteristic associated with a restriction level of 75%. Processor 16 may thus identify the current restriction level of air filter element 42 to be 75% (or, utilizing 10 inches of water vacuum as a reference, 7.5 inches of water vacuum).

After determining the current restriction level of air filter element 42, processor 16 then determines whether the restriction level is below 100% (STEP 74). If the restriction level is below 100%, processor 16 advances to STEP 76. If the restriction level is equal to or greater than 100%, processor 16 commands BCM 18 to display a REPLACE FILTER message on display 20 (FIG. 2) as indicated at STEP 78. If process 60 is carried out by a control system incorporating a different type of filter restriction indicator (e.g., a replace filter indicator light mounted on I/P 21), processor 16 may instead cause the replacement indicator to be activated (e.g., illumination of the filter indicator light).

Next, processor 16 advances to optional STEP 76 wherein processor 16 stores or displays additional filter status information. Stored filter status information may later be retrieved by a user utilizing a suitable user interface (e.g., a DIC of the type described above) or by a mechanic utilizing a diagnostics system. This additional filter status information may include remaining filter element life (e.g., in miles) and/or current filter restriction level (e.g., as a percentage). If auxiliary sensors 32 include a mileage recorder and a barometric sensor, the additional filter status information may also include average filter life (e.g., in miles, in months, etc.) and other data indicative of filter element performance.

Additional operational characteristics of air induction system 34 (FIG. 2) and the internal combustion engine of vehicle 10 (FIG. 1) may also be utilized in determining the restriction level of air filter element 42 (FIG. 2). For example, processor 16 (or another processor) may consider the temperature of the air flowing through air inlet 36 in determining the reference pressure and/or the restriction level (e.g., via a four-dimensional look-up table).

It should thus be appreciated that at least one embodiment of a method and system has been provided for monitoring the restriction level of a vehicle's air filter element that been provided may be performed by an onboard processor without the requirement of additional hardware. It should also be appreciated that the described embodiment or embodiments may provide an in-cabin indication of when a filter element should be replaced and may also provide additional status information relating to the air filter element.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any manner. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof

What is claimed is:

1. A process for monitoring the filter restriction level of a filter element utilized by an air induction system deployed on a vehicle that includes a mass air flow sensor, a manifold pressure sensor, and a throttle position sensor, the process carried out by a processor associated with the air induction system and operatively coupled to the mass air flow sensor, the manifold pressure sensor, and the throttle position sensor, the process comprising:
   receiving in the processor: (i) throttle position from the throttle position sensor, (ii) mass flow rate from the mass air flow sensor, and (iii) manifold pressure from the manifold pressure sensor;
   determining a reference pressure from the received mass flow rate and the received throttle position;
   establishing a pressure differential between the reference pressure and the received manifold pressure; and
   identifying a filter restriction level from the established pressure differential and the received mass flow rate.

2. A process according to claim 1 wherein the step of determining comprises comparing the received mass flow rate to a predetermined characteristic associated with the received throttle position.

3. A process according to claim 2 wherein the predetermined characteristic is a three-dimensional look-up table.

4. A process according to claim 2 wherein the predetermined characteristic is a function of mass flow rate versus reference pressure.

5. A process according to claim 4 further comprising selecting the function from a family of functions each associated with a different throttle position.

6. A process according to claim 1 wherein the step of identifying comprises comparing the received mass flow rate and the established pressure differential to a plurality of predetermined characteristic each associated with a different air filter restriction level.

7. A process according to claim 6 wherein the plurality of predetermined characteristics comprises a three-dimensional look-up table.

8. A process according to claim 6 wherein the plurality of predetermined characteristics comprises a family of functions of mass flow rate versus pressure differential.

9. A process according to claim 1 further comprising:
   comparing a current operational parameter of the vehicle to a predetermined threshold; and
   identifying a filter restriction level when the current operational parameter passes the predetermined threshold.

10. A process according to claim 9 wherein the predetermined threshold is associated with one of the group consisting of engine RPM, vehicle speed, and throttle position.

11. A process according to claim 1 wherein the vehicle further comprises a change filter indicator, and wherein the method further comprising:
   comparing the identified filter restriction level to a threshold restriction level; and
   activating the change filter indicator if the identified filter restriction level exceeds the threshold restriction level.

12. A process according to claim 11 wherein the change filter indicator comprises a display, and wherein the step of activating the change filter indicator comprises generating a change filter message on the display.

13. A process according to claim 12 further comprising:
   determining additional filter status information; and
   displaying the additional filter status information on the display.

14. A process according to claim 13 wherein the additional filter status information comprises remaining filter element life.

15. A filter restriction monitoring system configured to monitor filter restriction level of a filter element utilized by an air induction system deployed on a vehicle that includes a mass air flow sensor, a manifold pressure sensor, and a throttle position sensor, the system comprising:
   means for receiving (i) throttle position from the throttle position sensor, (ii) mass flow rate from the mass air flow sensor, and (iii) manifold pressure from the manifold pressure sensor;
   means for determining a reference pressure from the received mass flow rate and the received throttle position;
   means for establishing a pressure differential between the reference pressure and the received manifold pressure; and
   means for identifying a filter restriction level from the established pressure differential and the received mass flow rate.

16. A filter restriction monitoring system deployed on a vehicle, comprising:
   (a) an air induction system, comprising:
      an air filter element;
      an intake manifold downstream of said air filter element;
      a throttle fluidly upstream of said intake manifold;
      a mass air flow sensor configured to monitor the mass air flow downstream of said air filter element;
      a manifold pressure sensor configured to monitor the air pressure within said intake manifold; and
      a throttle position sensor configured to monitor the position of said throttle; and
   (b) a processor coupled to said mass air flow sensor, said manifold pressure sensor, and said throttle position sensor, said processor configured to: (i) determine a reference pressure from a mass flow rate received from the mass air flow sensor and from a throttle position received from the throttle position sensor, (ii) determine a reference pressure from the received mass flow rate and the received throttle position, (iii) establish a pressure differential between the reference pressure and the received manifold pressure, and (iv) identify a filter restriction level of said air filter element from the established pressure differential and the received mass flow rate.

17. A filter restriction monitoring system according to claim 16 wherein said air induction system further comprises at least one sensor from the group consisting of an inlet air temperature sensor, an engine RPM sensor, a vehicle speed sensor, a vehicle mileage recorder, and a barometric sensor.

18. A filter restriction monitoring system according to claim 16 further comprising a change filter indicator coupled to said processor, said processor configured to activate said change filter indicator when the determined filter restriction level exceeds a predetermined threshold.

19. A filter restriction monitoring system according to claim 18 wherein said change filter indicator comprises a display and wherein said processor is configured to generate a change filter message on said display when the determined filter restriction level exceeds the predetermined threshold.

* * * * *